No. 721,699. PATENTED MAR. 3, 1903.
W. D. HARNED.
SPRING MECHANISM FOR SHADE ROLLERS.
APPLICATION FILED NOV. 14, 1902.

NO MODEL.

Witnesses
C. F. Kilgore
Ethel M. Lowe

Inventor
William D. Harned,
by Harry P. Williams
Attorney

UNITED STATES PATENT OFFICE.

WILLIAM D. HARNED, OF MERIDEN, CONNECTICUT, ASSIGNOR TO THE MERIDEN CURTAIN FIXTURE CO., OF MERIDEN, CONNECTICUT, A CORPORATION OF CONNECTICUT.

SPRING MECHANISM FOR SHADE-ROLLERS.

SPECIFICATION forming part of Letters Patent No. 721,699, dated March 3, 1903.

Application filed November 14, 1902. Serial No. 131,423. (No model.)

*To all whom it may concern:*

Be it known that I, WILLIAM D. HARNED, a citizen of the United States, residing at Meriden, in the county of New Haven and State of Connecticut, have invented certain new and useful Improvements in Spring Mechanism for Shade-Rollers, of which the following is a specification.

This invention relates to a mechanism for connecting the spring and the roller of a window-shade.

The object of the invention is to provide a very cheap, durable, and easily-assembled mechanism for connecting the spring and the roller.

The mechanism shown as embodying the invention has a plate that is stamped from a piece of sheet metal with a central perforation for the spindle end, perforations for the pawl-pivots, outwardly-projecting lugs against which the washer that is outside of the pawls is held, and inwardly-projecting lugs that are driven into the end of the wood to prevent the plate from turning independently and that are perforated to receive the end of the spring. The spindle end has a perforation for the rivet that fastens it to the spindle, a flattened end for the bracket-socket, and a collar that is larger in diameter than the perforations through the plate and the washer, between which the collar is held in such position that the pawls may engage with notches in its periphery.

Figure 1:
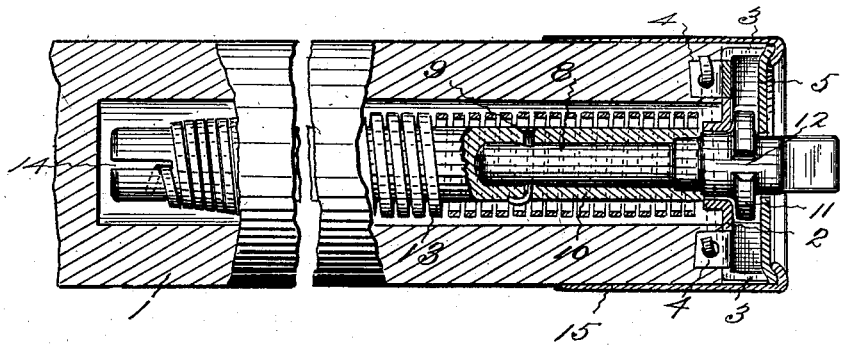
Figure 2:
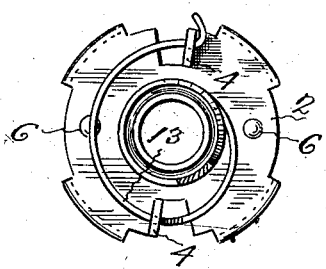
Figure 3:
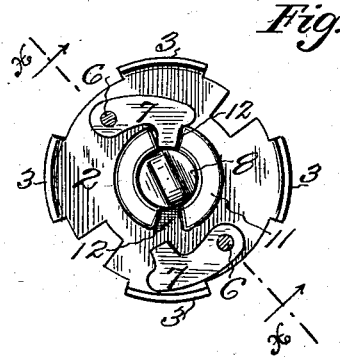
Figure 4:
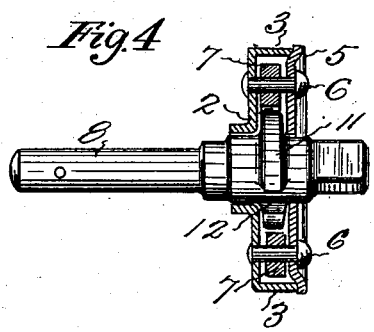

Figure 1 of the drawings is a longitudinal section, on enlarged scale, of an end of a shade-roller provided with the improvement. Fig. 2 is a plan of the inner face of the plate, showing the manner of connecting the spring. Fig. 3 is a plan of the outer face of the plate, showing a pawl engaged with a notch in the periphery of the collar on the spindle end; and Fig. 4 is a section through the plate and washer on the plane indicated by the broken line *x x* of Fig. 3, showing the spindle in side elevation.

The wooden roller 1 is bored out at one end for the spring in the usual manner.

The plate 2 is stamped to shape from a piece of sheet metal, preferably steel, with a central opening and outwardly-turned lugs 3 and inwardly-turned lugs 4. The outer lugs extend from the periphery of the plate and the inner lugs extend radially on diametrically opposite sides of the plate. A washer 5 is secured to the outer face of the plate against the outer lugs. This washer is stamped to shape with a central opening and is held in place by the rivets 6, which form the pivots for the pawls 7, that lie in the space between the outer face of the plate and the inner face of the washer. The perforations for these rivets are preferably punched when the plate and washer are blanked.

The spindle end 8 has its outer end flattened to fit the socket of a bracket, and has a perforation through its inner end for the tack 9 that secures the spindle 10 to the spindle end. On the spindle end in the space between the outer face of the plate and the inner face of the washer is a collar 11. This collar is larger in diameter than the opening through the plate and the opening through the washer, so that when the parts are assembled the spindle end cannot be removed from the plate and washer. In the periphery of the collar on the spindle end are notches 12, adapted to receive the ends of the pawls that hold the spindle end and plate together with the spring 13 under tension. The outer end of the spring passes through the perforations in the radial lugs that project inwardly from the plate and is bent back to prevent its withdrawal from these perforations. The inner end of the spring is thrust through the slot 14 in the inner end of the spindle.

The spindle end and attached spindle are held to the plate by the collar on the spindle end between the plate and washer, which are secured together by the rivets, which act as pawl-pivots.

The spring and spindle are thrust into the bore of the roller and the inwardly-turned plate-lugs driven into the end of the wood, so as to prevent the plate from rotating independently of the roller. A ferrule 15 is driven on the end of the roller outside of the balance mechanism. The edge of this ferrule bears against the rim of the washer and holds the parts against removal from the roller and prevents the wood from splitting.

All the parts of this mechanism are cheap to make. The ends of the spring are quickly fastened, respectively, to the spindle and to the plate in a very simple manner, and when the parts are together and are being applied to a roller there is no danger that the spring and spindle will drop down into the bore should it have been bored deeper than required. The inwardly-turned perforated lugs form very simple means for attaching the end of the spring to the plate, and they are easily driven into the end of the roller, so that the plate will surely turn the roller under the tension of the spring. If the roller is formed of tin instead of wood, the edge of the roller is turned over the edge of the washer in the usual manner.

I claim as my invention—

A spring mechanism for a shade-roller having a perforated plate with outwardly-turned peripheral lugs and inwardly-turned radially-extending perforated lugs, a perforated washer secured to and resting against the outer lugs, pawls pivotally held between the plate and the washer, a spindle end extending through the perforations in the plate and the washer and having a notched collar that is larger in diameter than the perforations through the plate and washer and that lies between the plate and the washer in position for the pawls to engage the notches, a spindle secured to the spindle end and a spring with one end secured to the spindle and the other end secured to the perforated lugs that extend inwardly from the plate, substantially as specified.

WILLIAM D. HARNED.

Witnesses:
W. F. PARKER,
H. R. WILLIAMS.